United States Patent [19]
Brandt, Jr.

[11] Patent Number: 5,623,176
[45] Date of Patent: Apr. 22, 1997

[54] HIGH PRECISION/LOW HYSTERESIS LINEAR ACTUATOR

[76] Inventor: Robert O. Brandt, Jr., P.O. Box 5606 Hanover Center, Wilmington, N.C. 28403

[21] Appl. No.: 171,915

[22] Filed: Dec. 21, 1993

[51] Int. Cl.$^6$ ............................ F16H 19/04; H02K 7/06
[52] U.S. Cl. ........................... 310/80; 74/89.17; 74/409
[58] Field of Search .................. 310/80; 74/89.17, 74/89.22, 409, 422, 89.21

[56] References Cited

U.S. PATENT DOCUMENTS

| | | | |
|---|---|---|---|
| 3,635,098 | 1/1972 | Patani et al. | 74/110 |
| 3,813,953 | 6/1974 | Wojtowicz | 74/89.17 |
| 3,945,260 | 3/1976 | Horvath et al. | 74/89.17 |
| 4,222,282 | 9/1980 | Taig | 74/457 |
| 4,602,521 | 7/1986 | Bishop et al. | 74/498 |
| 4,704,913 | 11/1987 | Zimmer | 74/89.17 |
| 4,714,388 | 12/1987 | Siler | 409/146 |
| 4,887,477 | 12/1989 | Hanser et al. | 74/89.17 |
| 5,161,424 | 11/1992 | Saberton et al. | 74/409 |
| 5,235,868 | 8/1993 | Culver | 74/471 X |
| 5,303,104 | 4/1994 | Aruga et al. | 360/160 |

*Primary Examiner*—Thomas M. Dougherty
*Assistant Examiner*—Michael J. Wallace, Jr.
*Attorney, Agent, or Firm*—Rosenthal & Putterman

[57] ABSTRACT

A high precision linear actuator with low hysteresis has an elongate linearly movable drive shaft for controlling a damper. The drive shaft is connected to a drive pad mounting a rack gear. A motor drive is adapted to receive an input signal in the form of an input voltage and converts the voltage into rotation of a motor drive shaft. A drive means is operatively associated with the motor drive shaft output and is in cooperating contacting relation with the rack gear for linearly translating the drive shaft. A position sensor outputs a signal indicating the linear displacement of the drive shaft.

8 Claims, 7 Drawing Sheets

HIGH PRECISION/LOW HYSTERESIS LINEAR ACTUATOR

FIELD OF THE INVENTION

This invention relates generally to the field of high precision linear actuators and more specifically to actuators such as are employed to control airflow control systems or robotic positioning devices.

BACKGROUND OF THE INVENTION

Linear actuators are well known and have been in use for a long time. However, actuators which have been developed for use in the field of airflow control service have generally been pneumatic. Pneumatic actuators are characterized by their slow response time and as a result, the actuator is often the "bottleneck" in the airflow control loop.

In an effort to improve actuators, attempts have been made at designing an electronically based actuator. The few electric actuators which have been sold in the damper market have been off-on time proportioning with AC drives. They have not controlled airflow well as time proportioning is a poor choice for control action when the system response is fast, such as for airflow. In addition, these prior art devices have had a high failure rate which is probably due to cost constraints imposed during design in order to make the product competitive with other available technologies.

Accordingly, it is an object of the present invention to provide a new and improved linear actuator with improved reliability and accuracy.

Another object of the present invention is to provide a linear actuator which lacks one or more of the shortcomings of the previously proposed systems.

A further object of the present invention is to provide a linear actuator which is electronic.

A still further object of the present invention is to provide a linear actuator having fast response time.

Yet another object of the present invention is to provide a linear actuator with low hysteresis.

An additional object of the present invention is to provide a linear actuator which delivers high performance at low cost.

SUMMARY OF THE INVENTION

The benefits and advantages of the present invention are achieved in a high precision linear actuator comprising an elongate linearly movable drive shaft. A drive pad is connected to the shaft and mounts a rack gear. A motor drive receives a voltage input signal and converts the input signal into rotation of a motor drive shaft output. A drive means is provided for linearly translating the drive shaft and is operatively associated with the rack gear. The drive means comprises a motor pulley connected to the drive shaft. A drive pinion is in cooperating contacting relation with the rack gear and a drive pulley operatively associated with the rack gear and adapted to drive the rack gear upon rotation thereof. A timing belt is connected between the motor pulley and the drive pulley so that when a voltage signal is applied to the motor drive, the shaft rotates thereby causing the drive means to correspondingly linearly translate the drive shaft.

BRIEF DESCRIPTION OF THE DRAWINGS

Some of the features and advantages of the invention having been briefly stated, others will appear from the detailed description which follows, when taken in connection with the accompanying drawings, in which.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention hereindescribed while still achieving the favorable results of this invention. Accordingly, the description which follows is to be understood as a broad teaching disclosure directed to persons of skill in the appropriate art and not as limiting upon the present invention.

Figure 1:
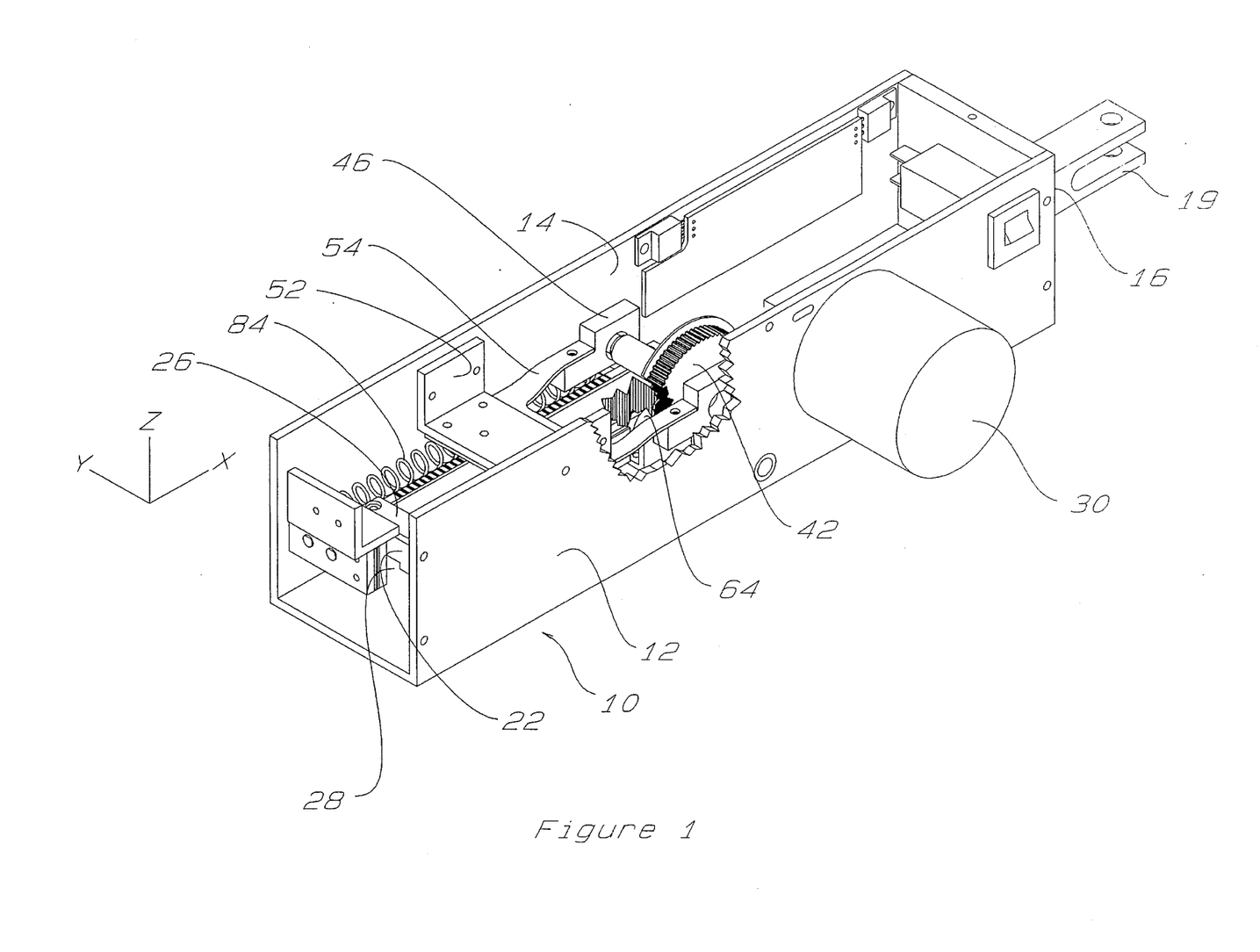
FIG. 1 is a perspective view, partially broken away, of the linear actuator according to the present invention.
Figure 2:
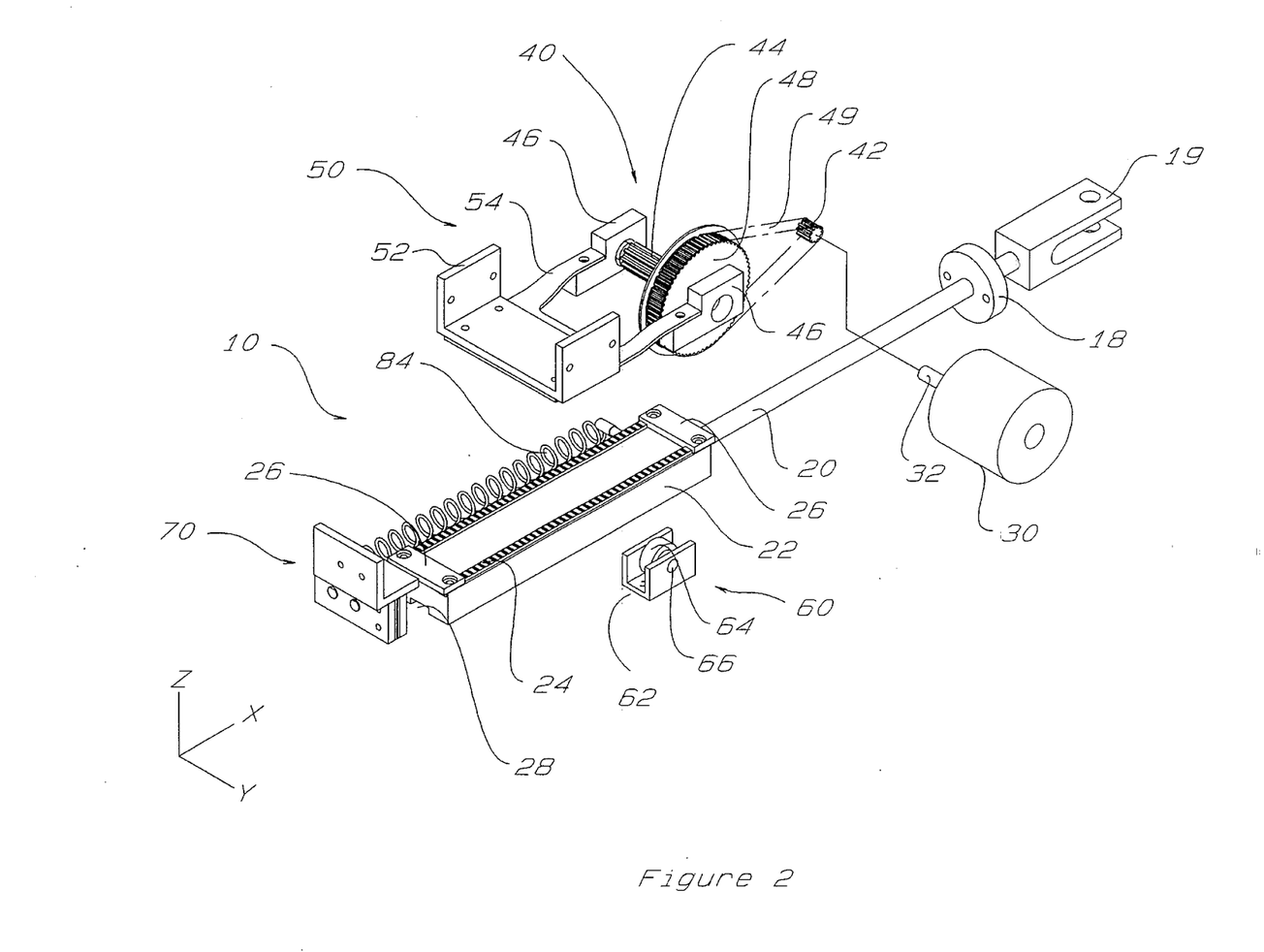
FIG. 2 is an exploded view of the linear actuator according to the present invention.
Figure 3:
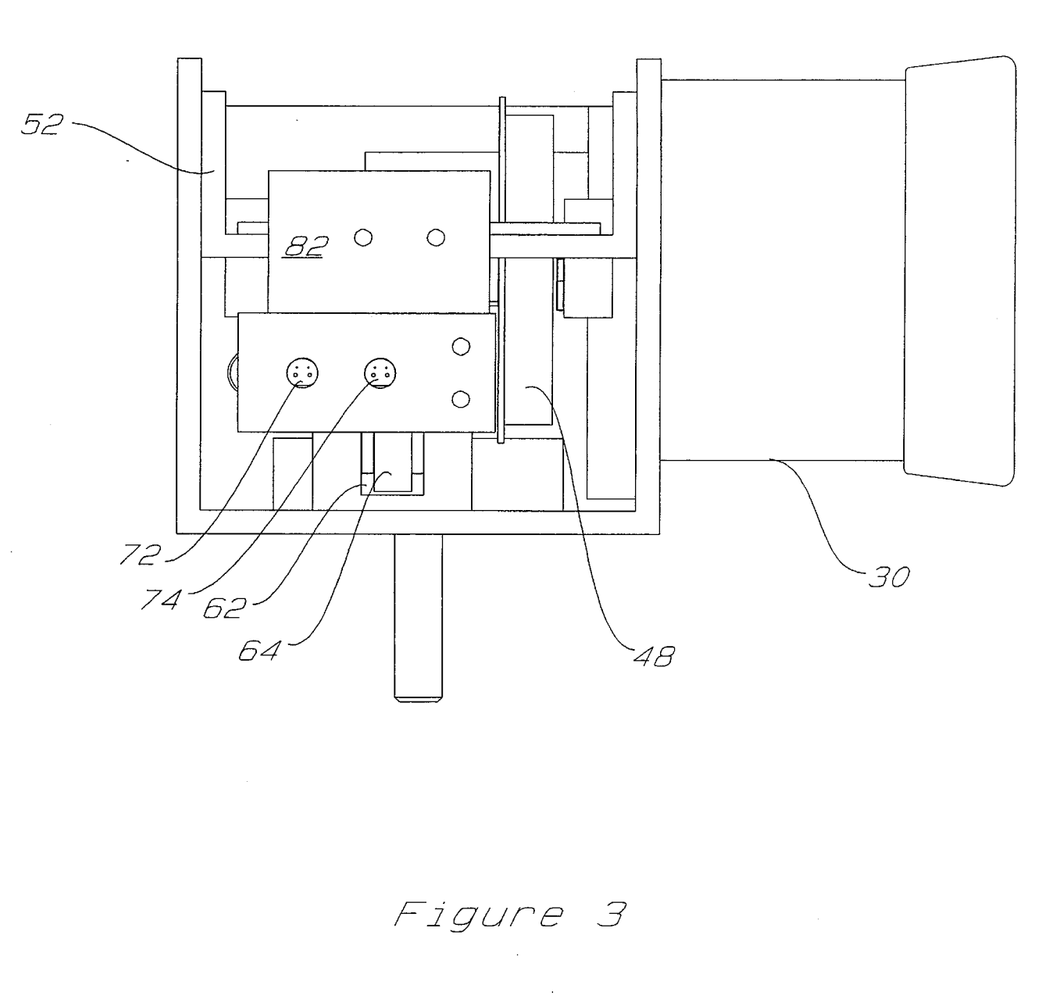
FIG. 3 is an end view, of the linear actuator according to the present invention.
Figure 4:
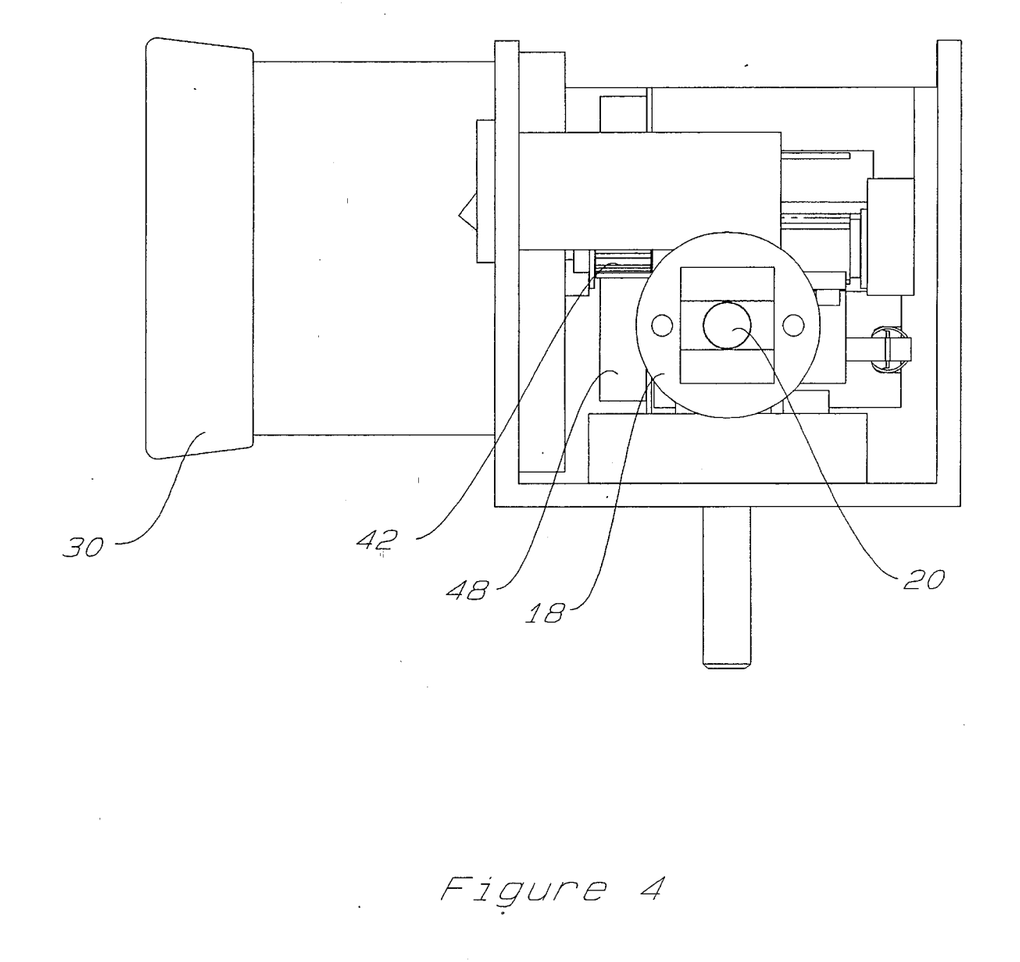
FIG. 4 is an end view of the linear actuator according to the present invention.
Figure 5:
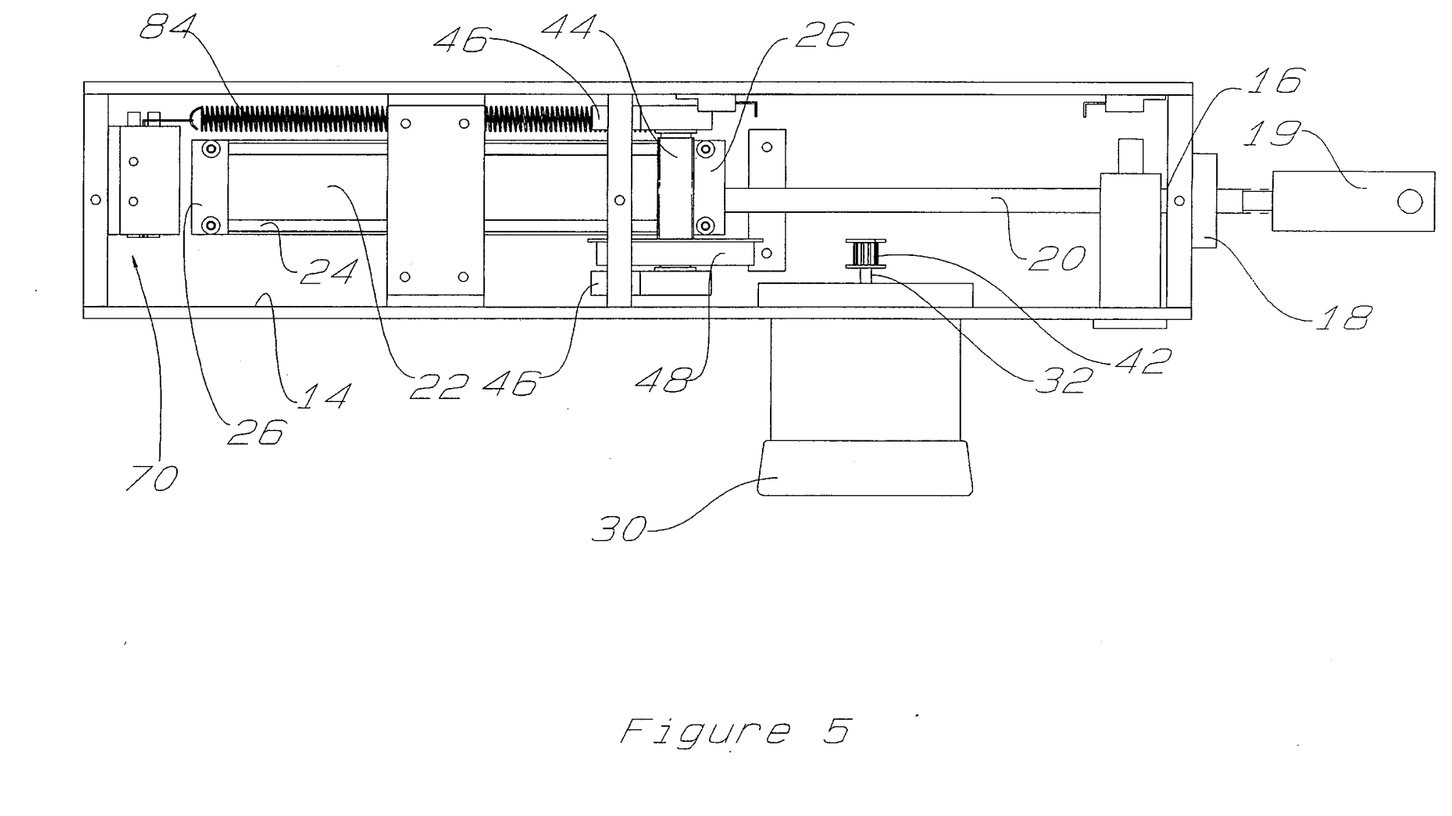
FIG. 5 is a plan view of the linear actuator according to the present invention.

Referring more specifically to the drawings and particularly to FIGS. 1 & 2, the linear actuator according to the present invention is there illustrated. The actuator generally indicated at 10 is mounted within a housing 12, which when in use would be mounted proximate or within the duct work and connected to a damper to be controlled. The housing 12 is fabricated from stainless steel or any other material which is structural for the given application. The housing 12 is an elongate box-like member defining a cavity 14 having a hole defining an opening 16 at one end. Mounted within opening 16 is rod bearing 18, which in the prototype that was constructed was fabricated from a low friction material such as TEFLON.

The linear actuator 10 includes a metal drive rod or shaft 20 which is inserted through rod bearing 18 and which is mounted for travel parallel to the longitudinal axis of the housing 12. One end of the drive rod 20 is mounted to a drive pad 22 (to be discussed) and the opposite end is connected to a clevis 19, which would be attached to the duct damper (not shown).

A drive pad means or drive pad 22 was fabricated from a rectangular block of aluminum, approximately one-half the length of the chamber. Rack gears 24 are mounted to the top of the drive pad 22 near the edges thereof as shown. Channels are machined in the drive pad proximate the edges thereof so that the teeth of the rack gear protrude upward therefrom. The rack gears 24 are preferably fabricated from NYLON or some other low friction long life material. A drive stop 26 is mounted transversely across drive pad 22 at the end of each rack gear 24. The underside of drive pad 22 includes a centering notch 28 which is machined into drive pad 22 along the entire length of the centerline thereof.

A motor drive means or motor 30 is mounted in the side wall of housing 12 via suitable means, and includes a motor drive shaft 32. The motor receives a voltage input signal and converts it into a proportional rotation of the motor drive shaft. In the prototype that was designed a Cannon EN35-T111N1B micromotor was chosen. This motor was chosen because it is manufactured in large quantities and provides good service life. The maximum force that the actuator is capable of is 6 lbf.-"0" speed. The maximum continuous force is 3 lbf.-"0" speed. One hundred per cent dynamic load is 280 ma or approximately 1.5 lbf. Based on a four inch linear travel, the arm length required to translate 90 degree rotation is approximately 3.0 inches. This set-up produces a maximum 18 in-lbf. of torque. The maximum linear speed is approximately 12 in/sec. or 4.7 radians/sec. in rotational mode. The mechanism will accommodate a motor of approximately twice the power (fifty per cent more torque and thirty three per cent more speed) than the current motor.

A drive means 40 is operatively associated with the motor drive shaft 32 and is in cooperating contacting relation with rack gear 24. In the illustrated embodiment the drive means 40 includes a motor pulley 42 connected via conventional means to drive shaft 32. A drive pinion 44 is mounted in cooperating contacting relation with the rack gear 24. The drive pinion 44 is mounted to a pair of bearing mount brackets 46 which include conventional low friction bearings as shown. In addition, a drive pulley 48 is operatively associated with the rack gear 24 and is adapted to drive the rack gear upon rotation thereof. A timing belt 49 is connected between the motor pulley and the drive pulley.

The linear actuator also includes compression means 50 for maintaining the drive pinion 44 in compressed contacting relation with the rack gear 24. Compression means 50 includes a spring mount 52 in the form of a U-shaped bracket that spans the width of housing 12 and is attached to the sides thereof via suitable means such as welding or metal screws. A drive spring 54 also substantially U-shaped is connected to the spring mount 52 so that the arm segments extend outward and are connected to bearing mounts brackets 46 as indicated in FIG. 2. Thus, it will be seen that when the compression means 50 is connected to the housing in such a manner that the drive spring is in tension, the compression means 50 maintains the rack gear 24 and the drive pinion 44 in compressed contact with each other. A fixed bearing support 60 is mounted under the center of the pinion gear and aids in preventing sideways torque. The bearing support includes a mounting bracket 62 connected to the bottom of housing 12, a bearing 64 is mounted for rotation on a pin 66 which spans the mounting bracket and is connected thereto. The bearing 64 is positioned within notch 28 and acts to support the drive pad 22 and prevents sideways movement thereof, thus preventing vibration and slowing component wear.

The linear actuator of the present invention is extremely accurate, has low hysteresis and fast response time. It is believed that the foregoing is due primarily to the just described design which emphasizes that the rack gear 24 and pinion gear 44 should be maintained in compression. For example, with extended use, that support bearing 64 will experience wear. Thus, the bearing is always pressed into contact with notch 28 so that there is no slack or backlash even in the event of bearing or gear wear. In addition, a compressed relation is always maintained between the rack gear 24 and the pinion gear 44 as the drive spring 54 is always exerting pressure in the form of a spring force thereon.

The foregoing "spring-loaded" rack and pinion design also has additional benefits as it significantly reduces backlash and dead band. For example, upon full deflection or over extension of the rack gear (such as occurs in an overload) condition, the pinion gear, since it is spring mounted, will rise up and be lifted out of the gear rack, thus acting as a clutch and preventing damage to the rack and pinion assembly. In addition, since the pinion gear is spring loaded against the rack gear, gear wear is taken up resulting in a further reduction in deadband.

Another benefit of the present design is its linearity which is accomplished by maintaining a constant belt tension regardless of rack position. As previously stated, the pinion gear 24 is mounted to drive spring 54 which is essentially mounted for limited arcuate movement. The arc of the drive spring 54 to the drive pulley 48, and the motor 30 to main drive pulley 48 are essentially mounted along the same line. The foregoing ensures negligible changes in belt tension as the drive pad 22 moves back and forth, and further when the pinion 44 contacts the end stops 26 and pops up and out of the rack gear 24 (overextension) belt tension remains essentially unchanged as the drive pulley is moving along its arc.

In another aspect of the invention, the linear actuator 10 includes a position sensing means 70 for monitoring the linear displacement of the output shaft 20. It is believed that the present position sensing system is a novel and significant improvement over those of the prior art as it produces an output signal based on actual position rather than an output signal based on a calculated displacement from a known reference point. The position sensing means 70 is adapted to produce an electrical output signal that is proportional to the linear displacement of the output shaft.

The position sensing means 70 includes a pair of reflective sensors 72, 74 each of which comprises a transistor and a photo diode which are mounted in side-by-side relation on a common block with an electronic circuit to be described hereinbelow. The sensors 72,74 are preferably selected from the same production lot so that they will have been fabricated from the same piece of silicon and subjected to the same processing. This ensures that any drift of the devices which may occur with use is the same as between the devices and can be cancelled with appropriate circuitry.

Figure 6:
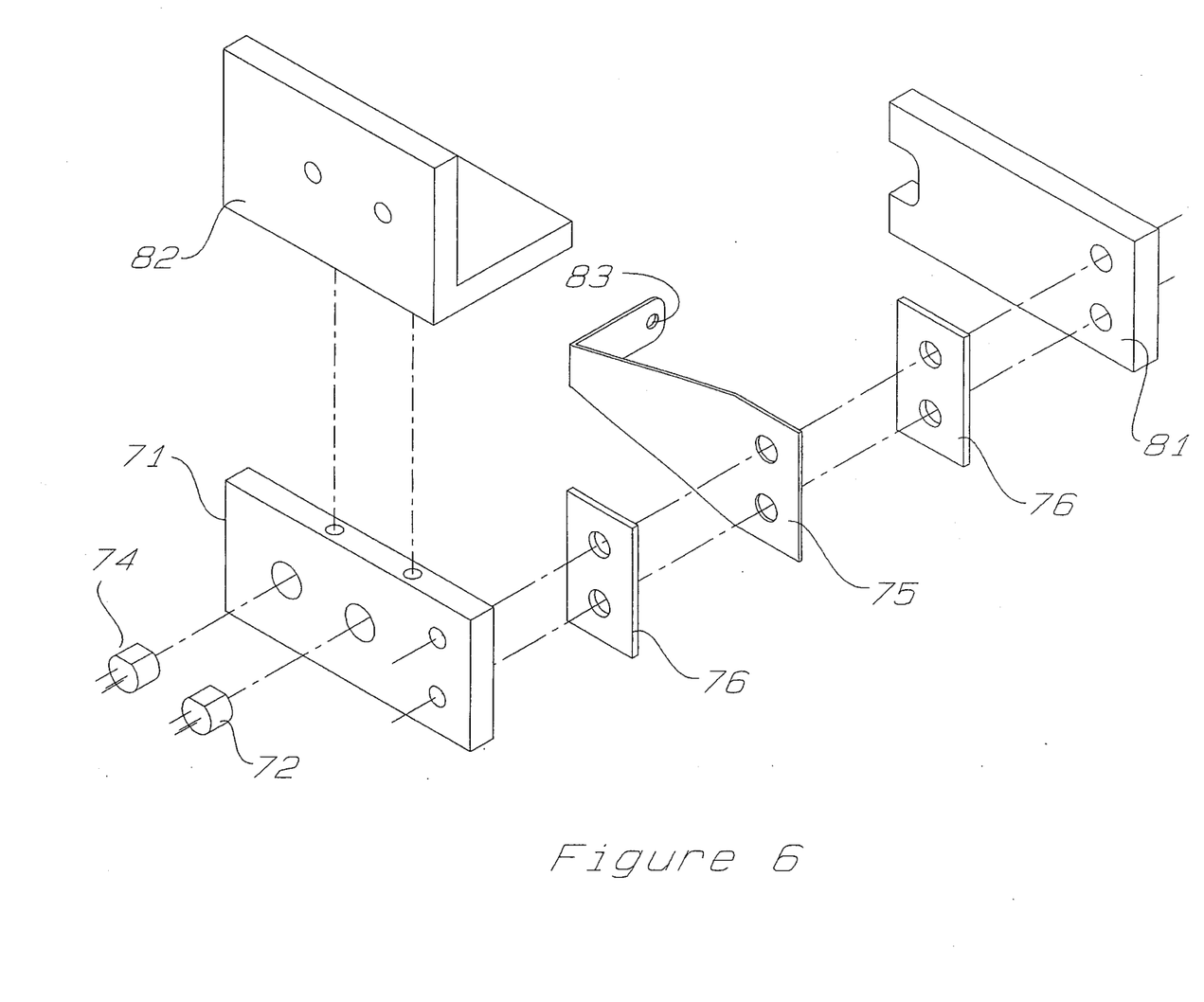
FIG. 6 is an exploded view of the position sensing means employed in accordance with the present invention.

Referring now to the figures and particularly to FIG. 6, the reflective sensors 72,74 are mounted in block 71. An L-shaped flexure bracket 75 is mounted between a pair of spacers 76. An end piece 81 is also provided and the foregoing structures 71,75,76,81 are all held together in sandwich fashion via suitable means such as screws (not shown). In addition, a mounting bracket 82 is connected (again, by screws) to mounting block 71 which is connected to housing 12.

The L-shaped flexure bracket 75 has the side nearest the reflective sensors 72,74 coated with a reflective surface and includes an opening 83 to which tensioning means 84 to be described is connected. It will be noted that the bracket 75 is tapered. Thus, most of the bending occurs near the slim end when a force is applied at opening 83. A tensioning means or tensioner 84 which may be a steel spring or a silicone tensioner has one end connected to opening 83 and the opposite end is connected alongside the drive pad as illustrated. Thus, the output of the reference photosensor positioned proximate the thick portion of flexure bracket 75 will remain relatively constant as it will remain a relatively constant distance from the sensor. Conversely, the measurement photosensor being positioned proximate the narrow portion of the bracket will vary in proportion bracket deflection which is a function of the tension placed on it by the tensioner which, in turn, is drive pad position dependent.

The reflective sensors such as are employed in the present invention are commercially available photomicrosensors which comprise an optical transmitter which normally takes the form of a light source such as an LED and an adjacent optical receiver (photodiode or phototransistor). Normally, the transmitter and receiver are positioned mounted in a plane adjacent one another on a common mounting block and the receiver is adapted to produce an output voltage that is proportional to the intensity of the light that is received by the receiver from the transmitter. With respect to the present invention, the near side region of the operational curve is selected due to its high sensitivity and linearity. It will be noted that alternate devices may be employed instead of the photomicrosensors just described; such devices include variable reluctance transducers, variable resistance transducers or variable capacitance transducers. The foregoing devices are well known to those skilled in the art and a detailed discussion of the design criteria of each is not deemed necessary.

As briefly mentioned, flexure bracket is tapered. The thick portion is essentially a fixed distance from the photodiode/sensor 74 and serves to reflect a reference signal back to the reference sensor. The thin side is subject to deflection in proportion to the drive pad/drive rod position, which results in a corresponding change in the light reflected therefrom back to the second phototransistor which results in a corresponding decrease in the reflected light intensity and output voltage signal.

Figure 7:
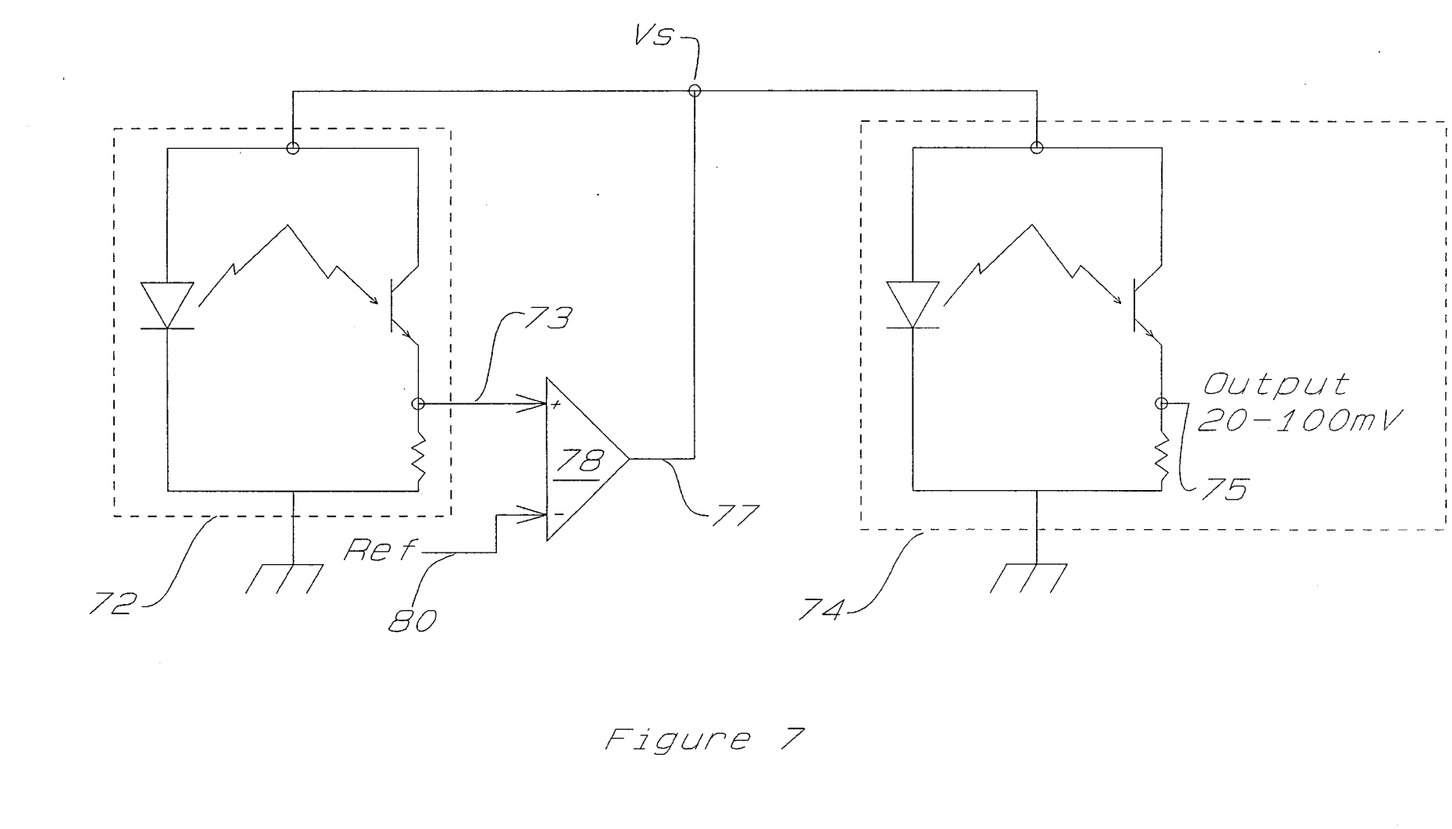
FIG. 7 is an electrical schematic diagram of the circuitry of the present invention employed to stabilize the output signal.

The output signal of the position sensor according to the present invention remains constant over time despite physical changes that occur in the photomicrosensor silicon. This is accomplished by the circuit as illustrated in FIG. 7. The photomicrosensors 72 (reference),74 (measurement) are connected to a common voltage source $V_s$. The output signal on line 73 from the phototransistor of photomicrosensor 72 becomes the positive input signal to the controller or operational amplifier 78. Similarly, a reference voltage $V_{ref}$ is the negative input on line 80 into operational amplifier 78. Thus, if the reference voltage signal decays over time, the controller 78 then modifies the current supplied to the LED portion of the first and second photomicrosensors 72,74 which raises the voltage on line 77, resulting in a constant output on line 73. Those skilled in circuit design will also be aware that the foregoing voltage may also be raised by diodes connected in series.

The second photomicrosensor output signal on line 75 (position measurement) produces an output signal in the form of an output voltage that is proportional to the distance between the sensor and the flexure bracket 75 which is also proportional to the position of the rod 20. Further details of the comparator and of the photomicrosensors are not dealt with herein in greater detail because such devices are commercially available and will be known to those skilled in the art.

In operation, the linear actuator is positioned within or near a duct with an airflow to be controlled. The clevis 19 is attached with a clevis pin (not shown) to an airflow damper such as a butterfly damper. It will be noted that in all likelihood the damper will be spring biased to the open position so that in the event of a power failure or system failure the damper will move to the fully open position, thus allowing gases to continue to be withdrawn from the fume hood.

A conventional feedback control loop (not shown) is employed to control the shaft/damper position. The control loop has two inputs. The first input is a first voltage signal or set point voltage supplied from the system itself or from the operator and represents the desired damper position. For example, in the case of a fume hood, this could be a voltage signal that is a function of sash position, i.e., when the sash is closed less air would have to be withdrawn to maintain the face pressure and consequently less air would be withdrawn from the fume hood and the damper would close off more of the ductwork. Conversely, if the sash were open more air would have to be withdrawn from the fume hood in order to maintain the face pressure and the damper would have to open the duct.

A voltage signal representing the actual or measured shaft position is output on line 75 and is the second input to the feedback control loop.

The feedback loop then compares the set point voltage signal and the measured position voltage signal and outputs whatever voltage is required to make the difference therebetween as close to zero as possible. The control loop output signal is then applied to the motor and varies in magnitude and polarity to cause the motor/gear rack combination to move the shaft to the set point position.

Due to the mass of the damper and related linkage and the spring forces acting on the damper, a current will likely be required at the motor input to hold the damper in the desired position even if the motor is not turning.

The foregoing embodiments and examples are to be considered illustrative, rather than restrictive of the invention, and those modifications which come within the meaning and range of equivalence of the claims are to be included therein.

That which is claimed is:

1. A high precision linear actuator comprising:

a housing defining a cavity;

an elongate linearly movable drive shaft positioned for reciprocating movement into and out of said housing;

a drive pad means connected to said drive shaft and mounting a rack gear means;

a motor drive means adapted to receive a voltage input signal and to convert said voltage input signal into rotation of a motor drive shaft;

a drive means operatively associated with said motor drive shaft, said drive means comprising a motor pulley mounted to said motor drive shaft, a drive pulley operatively associated with said rack gear means, a timing belt connected between said motor pulley and said drive pulley, and a drive pinion operatively associated with said drive pulley, said drive pinion being in cooperating contacting relation with said rack gear means;

means for maintaining the drive means and the rack gear means in compression, said means comprising a spring having one end connected to said housing and the other end being cantilevered such that the free end of said spring is in contact with and exerts a compressive force on said rack gear means such that said drive means and the rack gear means are continuously urged into compressive contacting relation;

whereby when a voltage signal is applied to the motor drive means, the motor drive shaft rotates thereby causing rotation of corresponding movement of the drive means and movement of the drive pad and linear translation of the drive shaft.

2. The high precision linear actuator according to claim 1 further including position sensing means for measuring the linear displacement of said drive shaft.

3. A high precision linear actuator comprising:

a housing defining a cavity;

an elongate linearly movable drive shaft said drive shaft being mounted within said housing for reciprocating movement into and out of said housing;

a drive pad means connected to said drive shaft and mounting a rack gear means, said drive pad means and rack gear means being mounted within said housing, and further wherein said drive pad means and said rack gear means are in longitudinal alignment with said drive shaft;

a motor drive means for receiving a voltage input signal and converting said voltage input signal into rotation of a motor drive shaft;

a drive means operatively associated with said rack gear means comprising:
(a) a motor pulley connected to said motor drive shaft;
(b) a drive pinion in cooperating contacting relation with said rack gear;
(c) a drive pulley operatively associated with said drive pinion and being adapted to move said rack gear upon rotation thereof;
(d) a timing belt connected between said motor pulley and said drive pulley, and
(e) a spring means having a first end and a second end, said first end being mounted to said housing and said second end being cantilevered such that the second end of said spring is in contact with and exerts a compressive force on said drive pinion such that the drive pinion and the rack gear are maintained in compressive contacting relation;

whereby when a voltage signal is applied to the motor drive means, the motor drive shaft rotates thereby causing the drive means to correspondingly linearly translate the drive shaft.

4. The high precision linear actuator according to claim 3 further including position sensing means for monitoring the linear displacement of said output shaft.

5. The high precision linear actuator according to claim 3 further including a bearing support in supporting relation with said drive pad means.

6. The high precision linear actuator according to claim 4 wherein said position sensing means comprises a transducer means adapted to output an electrical signal proportional to the deflection of said transducer means.

7. The high precision linear actuator according to claim 6 wherein said position sensing means comprises a spring having one of its ends connected to said transducer means and its opposite end connected in operative association with said drive shaft and wherein the said spring force acting on said position sensing means causes a deflection thereby in proportion to the linear translation of said drive shaft.

8. The high precision linear actuator according to claim 3 further including a moveable spring means that acts as a clutch between said rack gear means and said drive pinion.

* * * * *